Aug. 15, 1933.    T. M. HIESTER    1,922,088
MECHANISM FOR EXTRUDING AND ROLLING METAL
Filed July 10, 1931    2 Sheets-Sheet 2
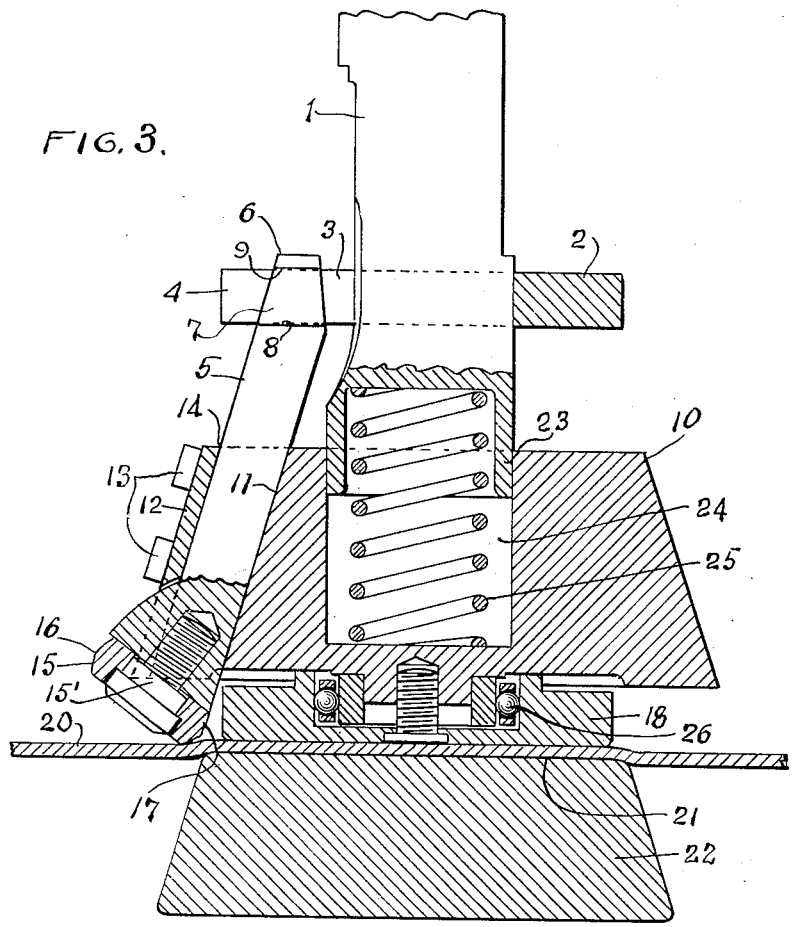
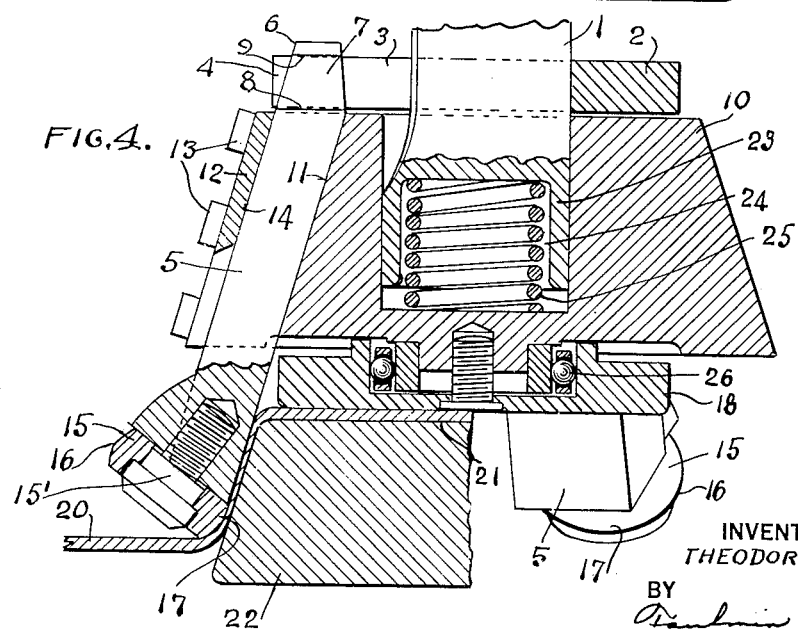
INVENTOR
THEODORE M. HIESTER,
BY
ATTORNEYS Patented Aug. 15, 1933

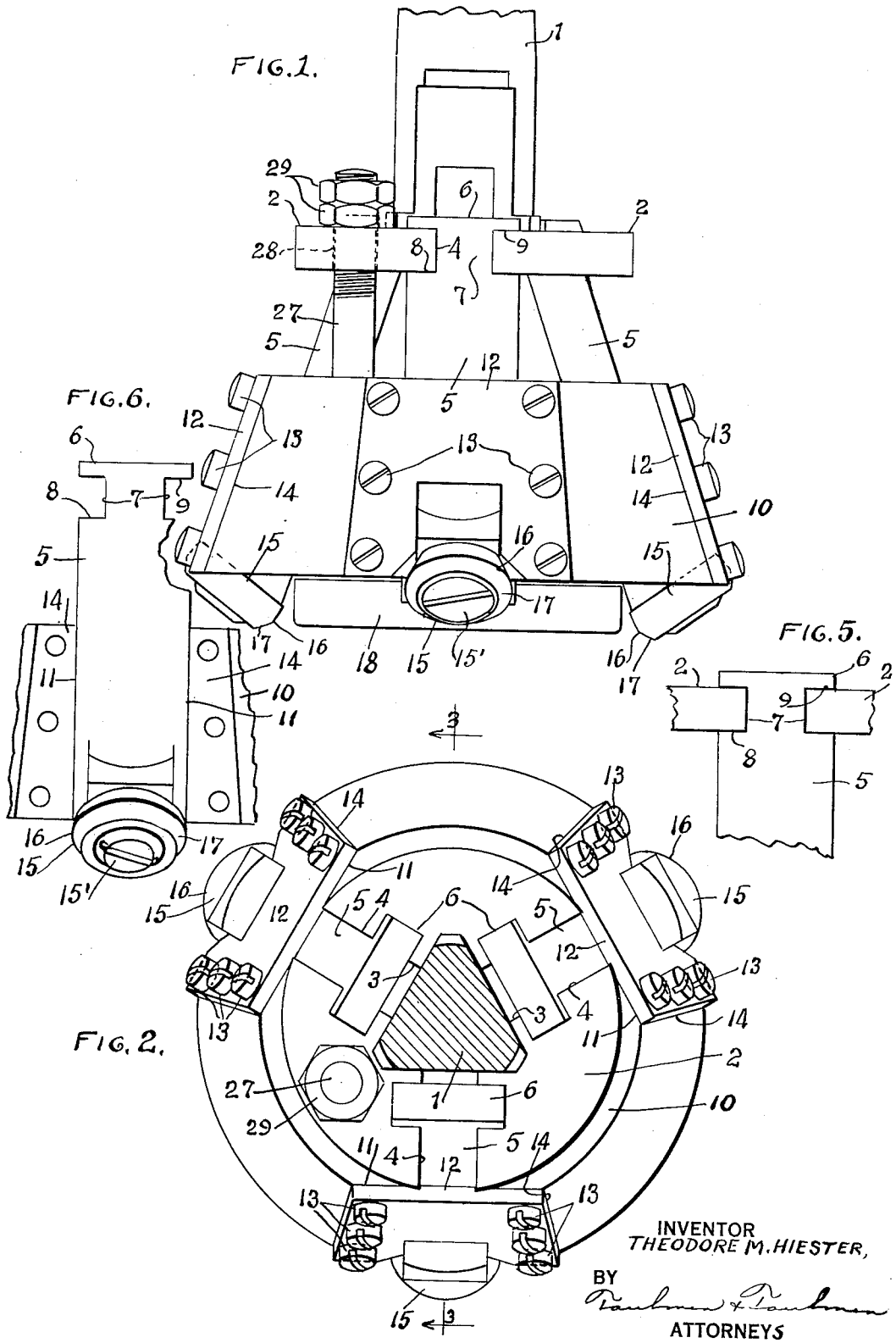

1,922,088

UNITED STATES PATENT OFFICE 1,922,088

MECHANISM FOR EXTRUDING AND ROLLING METAL

Theodore M. Hiester, Dayton, Ohio, assignor to United Aircraft Products, Inc., Dayton, Ohio, a Corporation of Ohio Application July 10, 1931. Serial No. 549,857

12 Claims. (Cl. 113—52)

My invention relates to mechanism for extruding and rolling metal articles.

It is the object of my invention to provide a roller supporting form and extruding head, which will roll and extrude simultaneously successive portions of a metal sheet in a flat spiral path.

In particular, it is my object to provide rigidly guided roller arms, a reciprocating head, a guiding head, and a telescopically arranged retaining head.

Referring to the drawings:

Figure 1 is a side elevation thereof;

Figure 2 is a top plan view thereof;

Figure 3 is a section on the line 3—3 of Figure 2 showing the parts in position with a form prior to forming the article;

Figure 4 is a similar view showing the parts in position during the formation of the article;

Figure 5 is a detail elevation of the connection of the roller arm with the reciprocating head;

Figure 6 is a side elevation of the guiding head with the cover plate removed.

Referring to the drawings in detail, 1 is a spindle attached to a suitable means for rotating it, such as a drill press, and for reciprocating it.

Mounted on this spindle is a reciprocating head or collar 2 which carries in the slots 3 and 4 the roller arms 5 which are provided with the heads 6 engaging the upper surface of the reciprocating head 2. This arm 5 is provided with a slot 7 having shoulders 8 and 9 that respectively engage with the top and bottom of the head 2 so that the arm 5 cannot move upwardly or downwardly after having once been inserted in the slot 3.

The lower part of the roller arm 5 is slidably guided in the guiding head 10 in the groove 11 and is retained in that groove by the cover plate 12 which is attached by the screws 13 to the surface 14 of the guiding head 10.

The lower end of the arm 5 has mounted therein the retaining screw and axle 15' at an angle to the axis of the arm 5, such retaining screw and axle constituting the bearing support for the rotatable roller 15 which is provided with the extrusion shoulder 16 and rolling surface 17.

The spindle 1, the reciprocating head 2, the arms 5 and the rollers 15 are adapted to move downwardly as a unit. The guiding head 10 is relatively stationary with respect thereto, as its retaining head 18 which rests on the top of the metal 20 which in turn rests on the top 21 of the form 22 resists any downward movement.

The relative movement between these two groups of mechanism is accommodated by the telescopically arranged sleeve 23 entering the chamber 24 in the head 10, which movement is resisted by the helical spring 25 interposed between the bottom of the spindle 1 within the sleeeve 23 and the bottom of the chamber 24.

A suitable thrust ball bearing 26 is interposed between the retaining head 18 and the guiding head 10. The metal sheet 20 is extruded and rolled over the form 22 at the combined straight line movement downwardly of the rollers 15 and their rotative movement in a spiral path in the course of their extruding and rolling action by which only that portion of the metal engaged by the rollers is rolled, extruded and thinned, leaving the rest of the metal undisturbed.

In this head the arms 5 are given predetermined positions. They are rigidly mounted. They are guided in straight way grooves or slots so that they will have at their lower ends a straight line movement downwardly and outwardly substantially parallel to the surface of the form 22.

In order to prevent any relative rotation between the guiding head and the reciprocating head, I mount a stud 27, which is freely slidable, through an aperture 28 in the reciprocating arm supporting head 2. The nuts 29 on this stud 27 serve to limit the relative movement outwardly between the guiding head and the reciprocating head.

It will be understood that I desire to comprehend within my invention such modifications as may be necessary to adapt it to varying conditions and uses.

Having thus fully described my invention, what I claim as new and desire to secure by Letters Patent, is:

1. In a head for extruding metal articles, a spindle, a reciprocating arm supporting head, arms mounted on the head to reciprocate therewith but adapted to move laterally thereof, a guiding head adapted to engage and guide said arms, said guiding head having thereon a rotatable retaining head.

2. In a head, a rotating reciprocating spindle, arms connected thereto for longitudinal movement therewith but lateral movement independent thereof, and means relatively movable with respect to said spindle adapted to engage and guide said arms, said means having thereon a rotatable retaining head.

3. In a head, a rotating reciprocating spindle, arms connected thereto for longitudinal movement therewith but lateral movement independent thereof, means relatively movable with respect to said spindle adapted to engage and guide said arms, and means on said last mentioned means for engaging the metal sheet to hold it.

4. In a head, a reciprocating rotating spindle, downwardly and outwardly extended arms connected thereto, means of guiding said arms downwardly and outwardly, extrusion rollers mounted on the ends of said arms, and yielding means for accommodating the relative movement between said guiding means and spindle.

5. In a head, a reciprocating rotating spindle, downwardly and outwardly extended arms connected thereto, means of guiding said arms downwardly and outwardly, extrusion rollers mounted on the ends of said arms, yielding means for accommodating the relative movement between said guiding means and spindle, a form adapted to support a metal sheet, and means adapted to engage the top of said metal sheet over the form carried by said guiding means.

6. In a head, a reciprocating rotating spindle, downwardly and outwardly extended arms connected thereto, means of guiding said arms downwardly and outwardly, extrusion rollers mounted on the ends of said arms, yielding means for accommodating the relative movement between said guiding means and spindle, a form adapted to support a metal sheet, means adapted to engage the top of said metal sheet over the form carried by said guiding means, and ball bearing means therebetween.

7. In combination in a spindle, arms mounted thereon depending downwardly and outwardly therefrom in fixed planes, rollers mounted on the ends thereof, means to support and guide the lower ends of said arms in the planes in which they are fixed, and yielding means for resisting the approach of said guiding means and spindle one to the other, and a form for supporting said guiding means against the force of said yielding means engaged by the spindle.

8. In combination, a spindle adapted to reciprocate and rotate, a plurality of downwardly and outwardly extending, rigidly mounted roller arms telescopically arranged to project through a guiding head, a guiding head, rollers on the free ends of said arms below said head, said arms being attached to the spindle above the head, telescopic guiding means between said guiding means and the spindle, yielding means therebetween, a retaining head mounted on the guiding head, a form adapted to engage metal beneath said retaining head.

9. In a head for extruding metal articles, the combination of a plurality of movable arms, means to support and rotate said plurality of movable arms connected thereto, means having a rotating head to engage the article being extruded and guide said support and arms in a predetermined path downwardly and outwardly, and extrusion means on the end of said arms.

10. In a head for extruding metal articles, the combination of a plurality of movable arms, means to support and rotate said plurality of movable arms connected thereto, means having a rotating head to engage the article being extruded and guide said support and arms in a predetermined path downwardly and outwardly, and extrusion means on the end of said arms, said parts being so arranged that said extrusion means moves downwardly and outwardly in substantially a straight line.

11. In a head for extruding metal articles, the combination of a plurality of movable arms, means to support and retain said plurality of movable arms connected thereto, means having a rotating head to engage the article being extruded and guide said support and arms in a predetermined path downwardly and outwardly, extrusion means on the end of said arms, and means to rotate said arms.

12. In a head for extruding metal articles, the combination of a plurality of movable arms, means to support and retain said plurality of movable arms connected thereto, means having a rotating head to engage the article being extruded and guide said support and arms in a predetermined path downwardly and outwardly, extrusion means on the end of said arms, said parts being so arranged that said extrusion means moves downwardly and outwardly in substantially a straight line, and means to rotate said arms.

THEODORE M. HIESTER.